(12) United States Patent
Gray, III et al.

(10) Patent No.: US 7,389,365 B2
(45) Date of Patent: Jun. 17, 2008

(54) ARBITRATING AND SERVICING POLYCHRONOUS DATA REQUESTS IN DIRECT MEMORY ACCESS

(75) Inventors: Donald M. Gray, III, San Francisco, CA (US); Agha Zaigham Ahsan, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 11/126,111

(22) Filed: May 10, 2005

(65) Prior Publication Data
US 2005/0204074 A1    Sep. 15, 2005

Related U.S. Application Data

(60) Division of application No. 10/945,052, filed on Sep. 20, 2004, now Pat. No. 6,976,098, which is a continuation of application No. 09/875,512, filed on Jun. 1, 2001, now Pat. No. 6,795,875, which is a continuation-in-part of application No. 09/628,473, filed on Jul. 31, 2000, now Pat. No. 6,816,923.

(51) Int. Cl.
*G06F 13/28* (2006.01)
(52) U.S. Cl. .................................. 710/22; 710/25
(58) Field of Classification Search .................. None
See application file for complete search history.

(56) References Cited

U.S. PATENT DOCUMENTS

| | | | | |
|---|---|---|---|---|
| 5,754,884 A | * | 5/1998 | Swanstrom | 710/22 |
| 6,167,465 A | * | 12/2000 | Parvin et al. | 710/22 |
| 6,209,042 B1 | * | 3/2001 | Yanagisawa et al. | 710/3 |
| 6,249,833 B1 | * | 6/2001 | Takahashi | 710/308 |

\* cited by examiner

*Primary Examiner*—Alford Kindred
*Assistant Examiner*—David E Martinez
(74) *Attorney, Agent, or Firm*—Workman Nydegger (57) ABSTRACT

Systems for servicing the data and memory requirements of system devices. A DMA engine that includes a data reservoir is provided that manages and arbitrates the data requests from the system devices. An arbitration unit is provided that only allows eligible devices to make a data request in any given cycle to ensure that all devices will be serviced within a programmable time period. The data reservoir contains the data buffers for each channel of each device. A memory interface ensures that sufficient data for each channel is present in the data reservoir by making requests to a system's memory based on an analysis of each channel. Based on this analysis, a request is either made to the system's main memory, or the channel waits until it is evaluated again in the future. Each channel is thereby guaranteed a response time.

20 Claims, 4 Drawing Sheets

ARBITRATING AND SERVICING POLYCHRONOUS DATA REQUESTS IN DIRECT MEMORY ACCESS

CROSS-REFERENCE TO RELATED APPLICATIONS

The present application is a divisional of U.S. patent application Ser. No. 10/945,052, filed on Sep. 20, 2004 and entitled, "Arbitrating and Servicing Polychronous Data Requests in Direct Memory Access," which is a continuation of U.S. patent application Ser. No. 09/875,512, filed on Jun. 1, 2001 and entitled "Arbitrating and Servicing Polychronous Data Requests in Direct Memory Access," which issued as U.S. Pat. No. 6,795,875 on Sep. 21, 2004, and which is a continuation-in-part of U.S. patent application Ser. No. 09/628,473, filed Jul. 31, 2000 and entitled "Arbitrating and Servicing Polychronous Data Requests in Direct Memory Access," which issued as U.S. Pat. No. 6,816,923 on Nov. 9, 2004, both of which are incorporated herein by reference in their entirety.

BACKGROUND OF THE INVENTION

1. The Field of the Invention

The present invention relates to systems and methods for transferring data to and from memory in a computer system. More particularly, the present invention relates to systems and methods for servicing the data and memory requirements of system devices by arbitrating the data requests of those devices.

2. The Prior State of the Art

An important operational aspect of a computer or of a computer system is the need to transfer data to and from the memory of the computer. However, if the computer's processor is used to perform the task of transferring data to and from the computer's memory, then the processor is unable to perform other functions. When a computer is supporting high speed devices that have significant memory needs, the processor bears a heavy load if the processor is required to copy data word by word to and from the computer's memory system for those devices. As a result, using the processor to transfer data in this manner can consume precious processing time.

A solution to this problem is Direct Memory Access (DMA). A DMA controller essentially relieves the processor of having to transfer data to and from memory by permitting a device to transfer data to or from the computer's memory without the use of the computer's processor. A significant advantage of DMA is that large amounts of data may be transferred before generating an interrupt to the computer to signal that the task is completed. Because the DMA controller is transferring data, the processor is therefore free to perform other tasks.

As computer systems become more sophisticated, however, it is becoming increasingly evident that there is a fundamental problem between the devices that take advantage of DMA and the memory systems of those computers. More specifically, the problem faced by current DMA modules is the ability to adequately service the growing number of high speed devices as well as their varying data requirements.

High performance memory systems preferably provide high bandwidth and prefer large data requests. This is in direct contrast to many devices, which may request small amounts of data, have low bandwidth, and require small latencies. This results in system inefficiencies as traditional devices individually communicate with the memory system in an effort to bridge this gap. It is possible that many different devices may be simultaneously making small data requests to a memory system that prefers to handle large memory requests. As a result, the performance of the memory system is decreased.

This situation makes it difficult for low bandwidth devices, which may have high priority, to effectively interact with high bandwidth devices that may have lower priority. For example, an audio device may support several different channels that receive data from memory. The audio device typically makes a data request to memory for data every few microseconds for those channels. Because devices such as audio devices recognize that they may experience significant latency from the memory system before their request is serviced, the audio device may implement an excessively large buffer to account for that latency.

This is not an optimum solution for several reasons. For instance, many devices maintain a large buffer because they do not have a guarantee that their data requests will be serviced within a particular time period. Other devices maintain an excessively large buffer because it is crucial that the data be delivered in a timely manner even though the devices may have low bandwidth requirements. For example, if an audio device does not receive its data in a timely manner, the result is instantly noticed by a user. Additionally, each device must implement DMA control logic, which can be quite complex for some devices. In other words, the DMA control logic is effectively repeated for each device.

Current devices often interact with DMA systems independently of the other system devices and each device in the system is able to make a data request to the DMA at any time. As a result, it is difficult to determine which devices need to be serviced first. The arbitration performed by systems employing isochronous arbitration often defines fixed windows in which all devices that may require servicing are given a portion. These fixed windows are large from the perspective of high bandwidth devices and small from the perspective of low bandwidth devices. Thus, high bandwidth devices are required to buffer more data than they really need and low bandwidth devices often do not need to use their allocated portion of the window. This results in inefficiencies because all of the available bandwidth may not be used and additional memory is required for the buffers of high bandwidth devices. In essence, current systems do not adequately allow high priority devices to efficiently coexist with high bandwidth devices.

SUMMARY OF THE INVENTION

The present invention provides a DMA engine that manages the data requirements and requests of system devices. The DMA engine includes a data reservoir that effectively consolidates the separate memory buffers of the devices. In addition to consolidating memory, the DMA engine provides centralized addressing as well. The data reservoir is divided into smaller portions that correspond to each device. The DMA engine also provides a scalable bandwidth and latency to the system devices. An overall feature of the present invention is the ability to guarantee that a particular device will be serviced in a programmable response time. This guarantee enables the buffer sizes to be reduced, which conserves memory, as well as permits the available bandwidth to be efficiently utilized.

Because the DMA engine maintains the data reservoir, the DMA engine is responsible for providing each device with the data that the device requests. At the same time, the DMA engine is also responsible for monitoring the remaining data in the data reservoir such that a data request can be made to the system's memory when more data is required for a particular portion of the data reservoir. To accomplish these tasks, the DMA engine provides arbitration functionality to the devices as well as to the memory.

The arbitration functionality provided to the devices determines which devices are eligible to make a data request in a particular cycle. Each device may have multiple data channels, but the device is treated as a unit from the perspective of the DMA engine. By only allowing some of the devices to be eligible during a particular cycle, all devices are ensured of being serviced within a particular time period and high bandwidth devices are not permitted to consume more bandwidth than they were allocated.

The arbitration functionality provided between the DMA engine and the memory occurs on a per channel basis rather than a per device basis. Each channel is evaluated in turn to determine whether a data request should be made to memory or whether the channel can wait until it is evaluated again in the future. Because the number of channels is known and because the time needed to service a particular channel is known, each channel is assured of being serviced within a particular time period. This guarantee ensures that the data reservoir will have the data required by the system devices.

The arbitration interface between the system memory and the DMA engine addresses the data needs of each channel in a successive fashion by using a list that contains at least one entry for each channel. The DMA engine repeatedly cycles through the entries in the list to evaluate the data or memory requirements of each channel. In addition, the order in which the channels are evaluated can be programmed such that high bandwidth devices are serviced more frequently, while low bandwidth devices are serviced within a programmable time period. Thus, data requests to or from memory are for larger blocks of data that can withstand some latency.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention relates to systems for servicing and managing the data requests and memory requirements of devices operating within a computer system. A Direct Memory Access (DMA) engine acts as an intermediary between the memory system and the devices by consolidating the buffer requirements of the devices, providing scalable bandwidth and latency to both the devices and the memory system, minimizing the buffering requirements of the devices through guaranteed scheduling, and efficiently using idle time periods.

An overall feature of the DMA engine is the ability to support the data requirements of the devices in a particular system while ensuring sufficient response time and bandwidth for each device. The DMA engine includes a centralized data reservoir or buffer that replaces the buffers of the individual devices. In addition to reducing or eliminating the need for buffers in the various devices, the consolidated data reservoir of the DMA engine also provides centralized addressing. Also, by centralizing the buffer requirements into the data reservoir, the DMA engine is able to implement the DMA control logic a single time, whereas each device previously required separate DMA control logic.

Another feature of the DMA engine is related to the latency that devices often experience when interacting with memory. The DMA engine ensures that a request from a particular device for data will be handled within a predetermined time period in part by maintaining the data reservoir that holds each device's data. The data reservoir is maintained on a per channel basis by evaluating factors such as the bandwidth requirements of each channel associated with each device, the anticipated response time of the memory system to service the request of each channel, how long the viable data remaining in the data reservoir will last for each channel, and the like. This information is used to determine whether the channel being evaluated should be serviced immediately or whether the channel can wait until it is evaluated again before it is serviced. In this manner, the DMA engine ensures that each device or channel will have sufficient data stored in the data reservoir.

The DMA engine further ensures that the data requirements of all devices will be met within a certain time period by providing an interface to the DMA engine for both the devices and the memory. The DMA engine interface with the memory is adapted to the characteristics of a high performance memory system, while the DMA engine interface with the devices is adapted to the requirements of the devices. The DMA engine is therefore capable of accessing relatively large blocks of data from the memory while providing relatively smaller blocks of data to the devices from the data reservoir. Effectively, the DMA engine permits high priority devices, which may have low bandwidth requirements, to efficiently coexist with high bandwidth devices that may have lower priority.

The present invention extends to both methods and systems for servicing the memory requirements of multiple devices. The embodiments of the present invention may comprise a special purpose or general purpose computer including various computer hardware, as discussed in greater detail below.

Embodiments within the scope of the present invention also include computer-readable storage media having computer-executable instructions or data structures stored thereon. Such computer-readable storage media can be any available media which can be accessed by a general purpose or special purpose computer. One example of a special purpose computer is a set top box. Exemplary set top boxes include, but are not limited to, analog and digital devices such as satellite receivers, digital recording devices, cable boxes, video game consoles, Internet access boxes, and the like or any combination thereof. By way of example, and not limitation, such computer-readable storage media can comprise RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable transmission medium. Thus, any such a connection is properly termed a computer-readable transmission medium. Computer-executable instructions comprise, for example, instructions and data which cause a general purpose computer, special purpose computer, or special purpose processing device to perform a certain function or group of functions.

Figure 1:
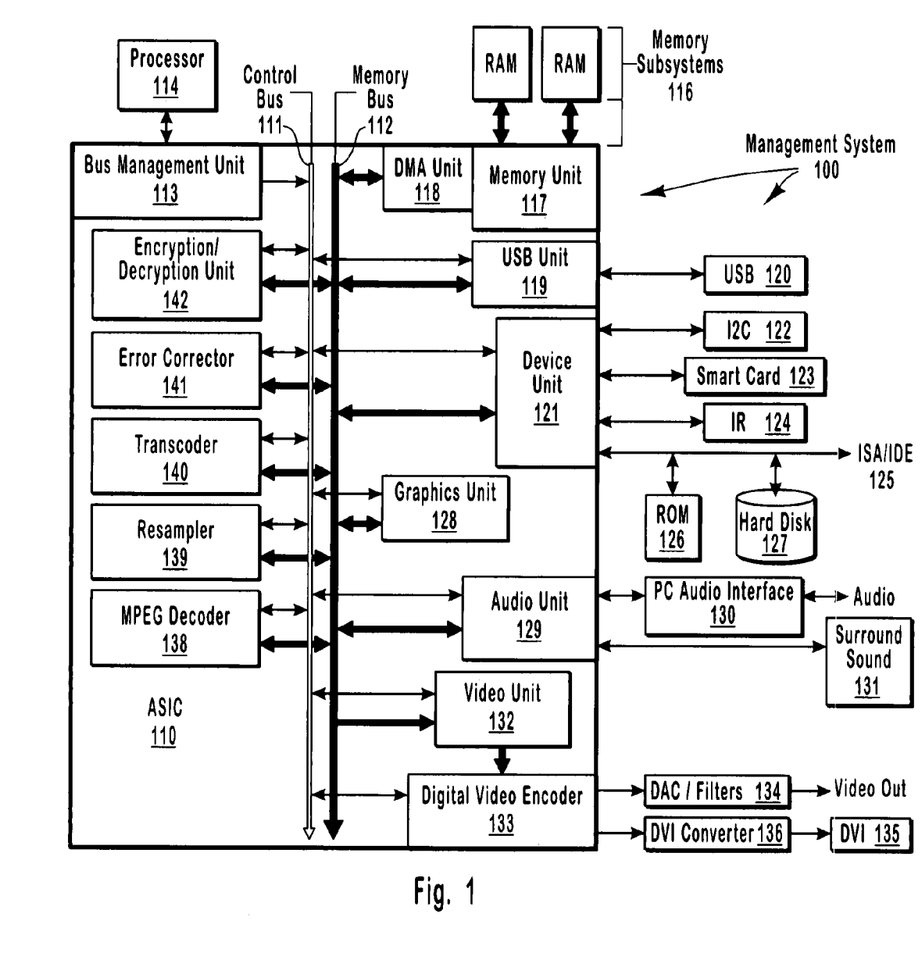
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

FIG. 1 illustrates a management system 100 that represents just one of many suitable operating environments in which the principles of the present invention may operate. The management system 100 consists of an ASIC 110 that includes a number of components that communicate over a control bus 111 and a memory bus 112. The control bus 111 carries relatively low bandwidth control information that controls the operation of each of the components of the ASIC 110. The memory bus 112 carries higher bandwidth information between each of the components of the ASIC 110 and memory. A bus management unit 113 manages the communication over the control bus 111 and also interfaces with a processor 114 and a PCI bus 115.

The processor 114 oversees the general video processing by dispatching instructions over the control bus 111 instructing the various components of the ASIC 110 to perform their specialized tasks. The processor 114 also monitors the progress of such tasks thus controlling the various components of ASIC 110 in a coordinated fashion.

Of course, memory is required to perform such coordinated operations. Accordingly, the ASIC 110 has access to one or more memory subsystems 116 that provides volatile memory that is shared between the components of the ASIC 110. The memory subsystems 116 may be any memory subsystem that allows for rapid access to stored information.

A memory unit 117 communicates directly with the memory subsystems 116. The Direct Memory Access unit (hereinafter "DMA" unit or "DMA engine") 118 acts as a buffering interface to support memory access for the remaining devices in the ASIC 110. Each of these remaining devices will now be described.

A Universal Serial Bus interface 119 runs a universal serial bus and may be any conventional USB interface adapted to interface with the control bus 111 and the memory bus 112.

A device unit 121 includes a number of interfaces for a number of miscellaneous devices. For example, the device unit 121 contains a bi-directional interface for an I2C bus 122 for communication with external components, a bi-directional interface for a smart card 123, a bi-directional Infra Red (IR) serial interface 124, and a bi-directional ISA/IDE bus 125 that interfaces with a Read Only Memory 126 and a hard disk drive 127.

A graphics unit 128 comprises a 3-D graphic rendering engine that may be, for example, an eight million polygon direct-X7 compatible 3-D graphics unit.

An audio unit 129 drives a PC audio interface 130 such as SPDIF.

A video unit 132 receives video data from the memory bus 112 and converts the video data into a digital display. The video unit 132 provides the digital display data to the digital video encoder 133 which converts the digital display data into the desired format (e.g., NTSC or HDTV) and provides the digital video through a Digital to Analog Converter (DAC) and filter 134 to a composite, S-Video or component output. The digital video encoder 133 may also output the video to a digital video interface (DVI) 135 using a DVI converter 136.

An MPEG decoder 138 is provided to decode MPEG streams. The MPEG decoder also performs subsampled decoding by reducing the frame size of the resulting decoded frame.

A resampler 139 performs resizing of the frame as needed to conform to the display format in force at the appropriate display device. The resampler also performs conversion of interlaced video to progressive video, and vice versa, as needed to conform to the appropriate display format.

A transcoder 140 receives MPEG compressed frames, and further compresses the MPEG frame thus reducing the storage and bandwidth requirements of the transcoded MPEG stream.

An error corrector 141 reduces error that was introduced due to the transmission of an MPEG stream to the video management system 100.

An encryption/decryption unit 142 performs encryption and decryption as appropriate.

While FIG. 1 and the corresponding discussion above provide a general description of a suitable environment in which the invention may be implemented, it will be appreciated that the features of the present invention disclosed herein may be practiced in association with a variety of different system configurations. For example, there are many types of devices that may be adapted to interface with the DMA engine 118 in accordance with the principles of the present invention, not just those devices described above with respect to FIG. 1.

As used herein, "data request" refers to either a read or a write operation. Data request can also apply to the interaction between the DMA engine and the system devices or to the interaction between the DMA engine and the main memory of the system. The present invention is primarily discussed in terms of memory reads, but it is understood to apply to memory writes as well. The memory or data requirements of a particular device can be evaluated from the perspective of either the DMA engine or the main memory of a system.

Figure 2:
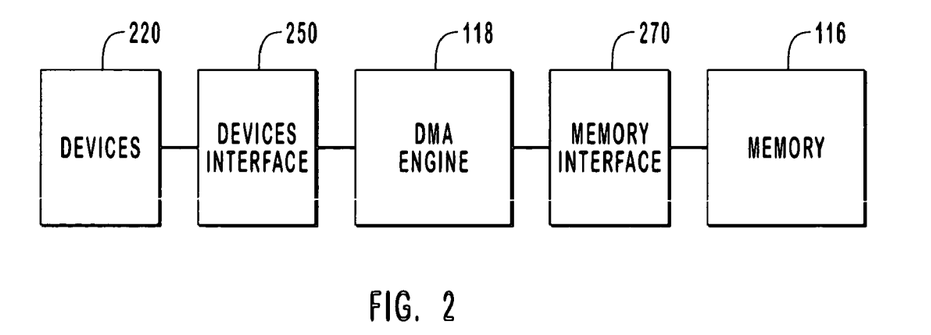
FIG. 2 is a block diagram illustrating a DMA engine that services the data and memory requirements of system devices.

FIG. 2 is a block diagram that illustrates a DMA engine such as DMA engine 118 for servicing and managing the memory or data requirements of system devices. Each device can be a hardware device or a software module or a combination thereof. The devices 220 interface with the DMA engine 118 through a devices interface 250. The devices interface 250 allows the DMA engine 118 to service the data requirements of the devices 220 while providing sufficient response time and bandwidth for the devices 220. The devices interface 250 further provides arbitration functionality to the devices 220 such that the DMA engine 118 services the data requests of eligible devices included in the devices 220 in any given cycle. In other words, the devices interface 250 determines which devices are eligible to make a service request to the DMA engine 118 in a given cycle or window. In this context, the data requests refer to reading or writing data to the DMA engine 118.

As described, the devices interface 250 makes a determination as to eligibility on a per device basis and does not consider the channels that may be associated with each device. The memory interface 270, however, determines whether to make a data request to memory 116 on a per channel basis. The memory interface 270 determines whether a particular channel should be serviced and provides arbitration functionality between the DMA engine 118 and the memory 116. The memory channel evaluates each channel in a repetitive fashion. In this manner, each channel is effectively guaranteed to be serviced within a particular time period. In this context, a data request refers to the transfer of data from the main memory to the DMA engine or from the DMA engine to the main memory. Thus, when a device makes a data request, it does not imply that data is transferred to or from the main memory. Also, when a data request is serviced by the main memory, it does not imply that a device has received or transferred data to the DMA engine even though these actions can occur at the same time.

In one example, the memory interface 270 may be viewed as a state machine that produces an output for a given input. The output is whether the channel being evaluated should be serviced and the input includes factors that determine whether the channel is critical. Those factors include, but are not limited to, the amount of data currently available to the channel in the DMA engine, how long it takes the main memory to service the data request of the channel, how long before the channel is evaluated again, and the like. After one channel has been evaluated, the state machine advances to the next channel.

After a particular sequence of channels has been evaluated, the state machine begins the evaluation process again at the beginning of the sequence. It is possible for a sequence to include a single channel more than once. While the devices interface 250 and the memory interface 270 are illustrated as being separate from the DMA engine 118, it is understood that the devices interface 250 and the memory interface 270 may be integral modules of the DMA engine 118. In addition, the devices interface 250 and the memory interface may comprise both hardware and software components.

Figure 3:
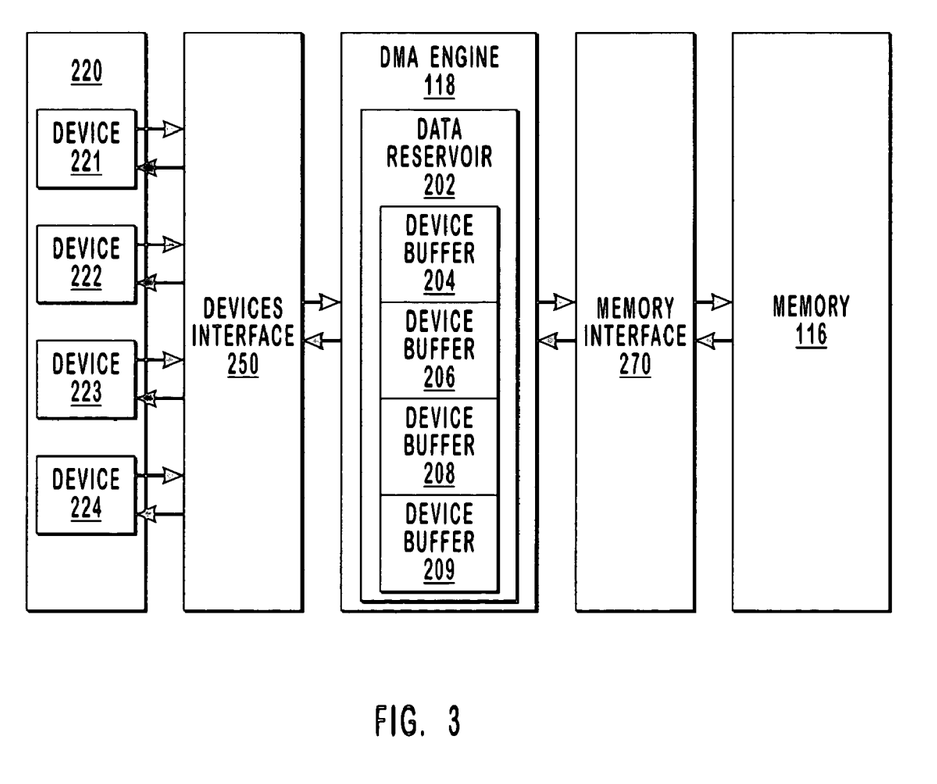
FIG. 3 is a more detailed block diagram of the DMA engine shown in FIG. 2.

FIG. 3 is a more detailed diagram illustrating the interaction between the devices 220, the memory 116 and the DMA engine 118. The exemplary system illustrated in FIG. 3 has devices 220 including device 221, device 222, device 223, and device 224. It is understood that the actual number of devices in a particular system is not limited to the illustrated devices but can vary depending on the configuration of the system. Each of the devices 221, 222, 223, and 224 has one or more channels over which data may be transferred. Exemplary devices include, but are not limited to audio devices, universal serial port (USB) devices, resampler devices, MPEG devices, any of the devices described above with respect to FIG. 1, and the like.

The DMA engine 118 includes a data reservoir 202 that includes device buffers 204, 206, 208, and 209. Each device buffer corresponds to a device included in the devices 220. More specifically, each channel of each device is allocated a portion of the data reservoir 202. In this manner, the buffer requirements of the devices 220 are consolidated into the data reservoir 202. More particularly, the data reservoir 202 replaces the small or medium sized buffers associated with the individual devices with a single large buffer. Not only does this arrangement conserve memory, but the DMA control logic that is usually implemented for each device may be instantiated a single time in the DMA engine 118.

In one example of the DMA engine 118, 56 independently configurable channels are available. In this example, there are 28 read channels and 28 write channels, and each device in the devices 220 may use more than one channel as previously stated. For example, an audio unit or device may use 4 read channels and 4 write channels. An MPEG unit or device may consume 5 channels consisting of 2 read channels, 1 control stream read channel, and 2 write data channels. A USB unit or device may use 1 read data channel and 1 write data channel. In other examples, the DMA engine 118 can support more or fewer channels. While FIG. 3 represents the data reservoir 202 as maintaining a device buffer for each device, the data reservoir 202 may actually maintain a portion of the data reservoir 202 for each channel of each device.

Whenever a device included in the devices 220 requires service for any of the channels of the device, a data request is sent to the DMA engine 118 through the device interface 250. The device interface 250, rather than performing arbitration on a per channel basis, arbitrates the data requests it receives on a per device or unit basis. If a device needs to make a data request for more than one channel, the device is responsible for making a data request for the higher priority channel because a device can usually only make a single request. From the perspective of the DMA engine 118, the bandwidth requirement of each device is determined by the device's channels, and the DMA engine 118 uses the latency of the urgent channel as the device latency when considering the device request.

The device interface 250 provides arbitration functionality that determines which devices or data requests are eligible to be serviced by the DMA engine 118. Once the eligible devices are identified, a basic arbitration scheme may be used to determine which data request should be granted. Determining which devices are eligible, however, includes scheduling the devices such that latencies can be effectively guaranteed. In addition, scheduling the devices in this manner prevents a particular device from consuming the available bandwidth until other devices have been serviced. Scheduling the devices will be discussed further with reference to FIG. 6.

In essence, the devices interface 250 provides a calculated latency and bandwidth tradeoff. A device having both a high priority and a low bandwidth may be able to withstand a larger latency than a device having a lower priority and a higher bandwidth. Proper scheduling ensures that high priority devices will have an adjustable, guaranteed response time while reducing the buffering requirements for the high bandwidth device. For example, audio devices are typically considered to be high priority devices and an MPEG device is a low priority device with high bandwidth. Because the MPEG device will be serviced in a programmable response time, the buffer requirement of the MPEG device is reduced even though other devices have to be serviced. A key aspect of the devices interface 250 is that each device is guaranteed of being serviced in a defined and programmable response time.

The devices are preferably managed by the DMA engine on a per device basis rather than a per channel basis because many of the devices may have low bandwidth and it is more efficient to consider the bandwidth of all the channels of a device. The memory interface 270, however, uses a list structure to manage the memory or data requirements of the individual channels. The entries in the list structure are channel identifiers that identify the channels of the devices 220.

The list, which is described in more detail with reference to FIG. 4, may be viewed as a circular list that is advanced to the next entry each time an entry or channel has been evaluated or serviced. Each channel represented by an entry in the list is evaluated for service on a regular basis, and each channel is assured of being serviced in a programmable response time. One reason the response time is programmable is because each channel can be included in the list structure more than once. This enables those channels that need more frequent servicing to be accommodated while still ensuring that the other channels will be evaluated or serviced within a known response time.

The DMA engine 118 uses the data reservoir 202 as a memory buffer for the devices 220. As the memory interface 270 rotates through the circular list maintained by the memory interface 270 and evaluates the channels represented by the entries in the circular list, the data remaining in the data reservoir 202 for each channel is evaluated. More specifically, the DMA engine 118 evaluates the portion of the data reservoir 202 that corresponds to the channel in the circular list of the memory interface 270 that is being examined.

The criteria for evaluating each portion of the data reservoir 202 include, but are not limited to, how many bytes are left in the portion of the data reservoir 202, a buffer time that corresponds to the rate at which the remaining data is being used by the device as well as how long those bytes will last, the latency of the memory system experienced while accessing the data from the memory 116, and an entry time representing when will the channel be evaluated again. These factors determine whether the channel being examined is critical or requires service. If the channel requires service a data request is made to the main memory. If the channel is not critical, then the channel can wait until it is evaluated again by the memory interface of the DMA engine. One benefit of examining each channel independently of the other channels is that the data can be managed in memory rather than in registers, which results in improved performance.

Figure 4:
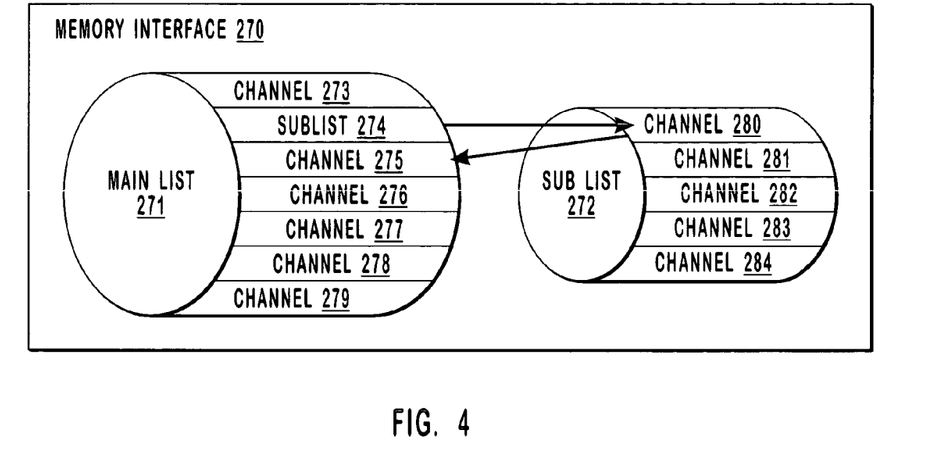
FIG. 4 is a block diagram illustrating the memory interface that provides arbitration functionality between the DMA engine and a system's memory.

FIG. 4 is a block diagram that represents the arbitration functionality between the DMA engine and the memory that is provided by the memory interface 270, which is included in the DMA engine 118. FIG. 4 illustrates the memory interface 270, which includes in this example, a main list 271 and a sub list 272. Each entry in the main list 271 corresponds to a channel. In a previous example, the DMA engine supported 56 channels, which are represented in the main list as entries or channel identifiers having the values of 0 to 55. The channel identifiers are represented as channels 273, 275, 276, 277, 278, and 279. It is understood that the length of the main list 271 can vary and only a few entries are illustrated in FIG. 4. Each channel identifier can be listed multiple times on the main list 271, but it is preferable that multiple entries for a single channel be evenly spaced on the main list 271. This allows a wide range of programmed response times to be implemented without requiring significant storage or memory. Also, this ensures that the entry time or the time until the channel is to be evaluated again is known.

The main list 271 also supports identifier numbers higher than the number of channels supported by the DMA engine. In this example, 8 additional channel identifiers are supported and are represented by the numbers 56 through 63. Seven of these channel identifiers indicate a jump or a call from the main list 271 to a sub list such as the sub list 272. The sub-list call 274 is an example of these identifiers and sub-list call 274 points to the sub list 272. The sub list 272 contains channel entries similar to the entries on the main list 271, and each time a call to the sub-list is made, one entry in the sub-list is evaluated. After one entry on the sub-list has been serviced, the next entry in the main list 271 is evaluated and serviced as indicated by arrow 290. The next time a call to the sub-list is made from the main list 271, the successive entry in the sub list 272 is performed.

Figure 5:
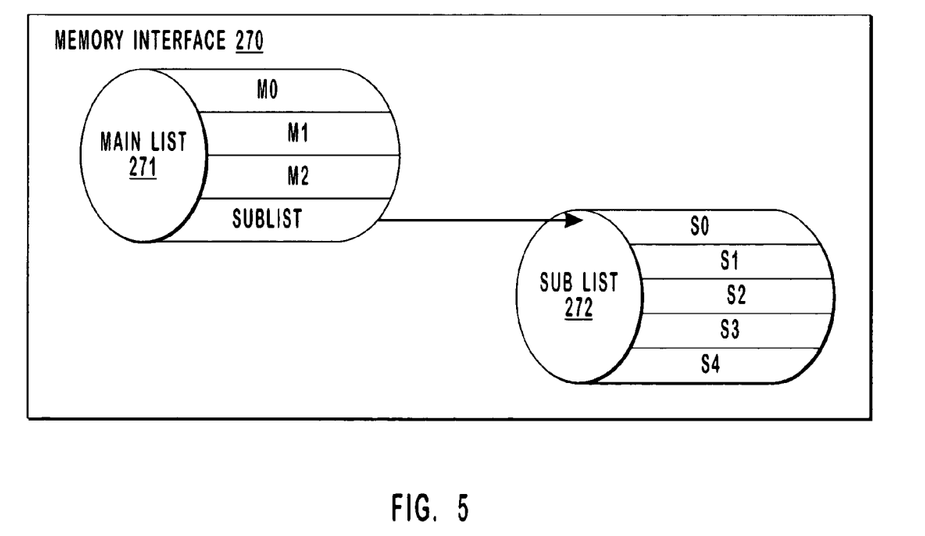
FIG. 5 is a block diagram illustrating a main list and a sub list and is used to show calls to channels on the main list as well as the sub list.

This provides the significant advantage of using smaller tables to replace a single larger table. In FIG. 5, for example, if a main list 271 had channels M0, M1 and M2 and the sub-list 272 had channels S0, S1, S2, S3, and S4, then the calling order of the entries in both lists would be M0, M1, M2, S0, M0, M1, M2, S1, M0, M1, M2, S2, M0, M1, M2, S3, M0, M1, M2, and S4. If a single list were used to implement this example, 20 entries would be needed in the list. By using a main list and a sub-list, however, only nine entries are needed in this example: a four entry main list and a five entry sub-list.

As illustrated in the previous example, only one entry on the sub-list is evaluated on the sub-list each time a call is made to that sub-list. Thus, another significant advantage of the sub list 272 is that the sub list 272 may be used to hold channels that can withstand longer latencies. Another advantage of the sub list 272 is that the main list 271 may be significantly shorter when sub lists are employed. Otherwise, the main list 271 would have to contain space for the entries on the sub list each time a jump to the sub list occurs. Thus, the use of sub lists conserves memory.

With reference to both FIGS. 3 and 4, assume that channel 273 is an identifier for one of the channels of the device 221. Also assume that the DMA engine 118 maintains the device buffer 204 for the channel 273. When the main list 271 reaches the channel 273, the channel 273 is evaluated to determine whether a data request should be made to memory 116. In the evaluation, the channel 273 is first checked to determine basic information such as whether the channel is enabled and which way the data is flowing, either to or from the memory 116. Next, full configuration data of the channel 273 is accessed from a memory channel control to determine the bandwidth requirement, the time until the channel 273 will next have an opportunity for service, the data format, the access style, and the like.

Next, the available data for the channel in the device buffer 204 is determined by accessing, for example, memory pointers. The amount of available data, in conjunction with how fast the available data is being used, determines how much time is represented by the available data. This value is compared against the response time, which includes how long until the channel will next be examined, as well as an allowance for system overhead. If the comparison indicates that the time remaining to the channel 273 is less than the response time, then the channel 273 is considered critical and a data request for service is posted by the DMA engine 118. If the channel 273 is critical, the data request is placed in a critical request queue for servicing. If the channel 273 is not critical, the data request may be placed in a non-critical request queue.

The critical requests, which are stored in the critical request queue, are then processed or serviced. The critical request queue is preferably a first in first out (FIFO) queue that may be reordered on occasion. In one example, the first four data requests in the queue are examined and serviced in an optimal order. The critical queue stores, in this example, the channel identifier; and control information including, but not limited to, current memory page address, first memory sub-page address, current memory length, transaction size, data format, data access style, and the like.

The non-critical request queue is not essential to the operation of the invention, but is used to hold the most pressing non-critical data requests. This queue is able to improve memory efficiency by making use of available cycles. For example, if the critical request queue is empty, then data requests in the non-critical queue may be serviced. Data requests in the non-critical queue may remain indefinitely if there is a large volume of other system traffic. If a request in the non-critical queue becomes critical, it is moved to the critical queue for servicing.

When determining the response time for a particular channel, it is often necessary to compute the worst case scenario for that channel. This is often dependent on several factors, including, but not limited to the response time of the memory system, the transaction size and the like. In order to determine whether a particular channel should be serviced involves an analysis of several factors, including but not limited to, the time until the channel will be checked again, the number of requests in the critical queue before a request is posted, the worst case latency from when a requests is posted until it is granted by the memory; and the worst case latency from when a request is granted until its servicing is complete. Some of these factors are design constants while others are dependent on the channel.

Because the main list 271 is embodied as a circular list, and because the worst case situations are considered, it is possible to guarantee that a particular channel will be serviced within a certain time period or frame. The advantage of this system is that the data requests to memory from the DMA engine are more suited to the characteristics of the high performance memory. Thus, the DMA engine preferably makes larges requests, accommodates large bandwidth, and is capable of experiencing significant latency without having an impact on the devices.

Figure 6:
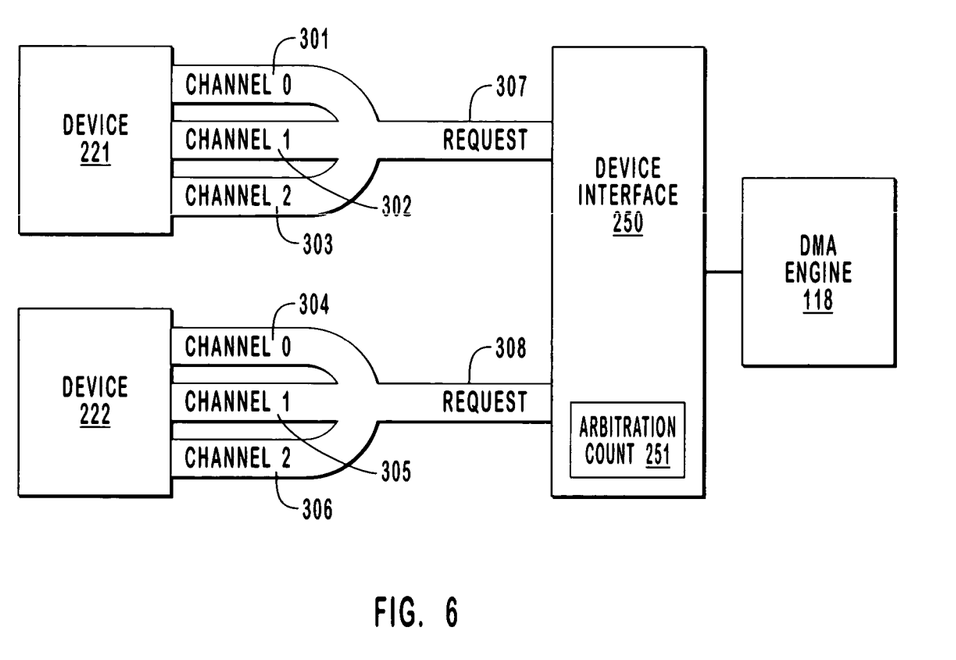
FIG. 6 is a block diagram illustrating the devices interface that provides arbitration functionality between the DMA engine and the system devices.

FIG. 6 illustrates the arbitration functionality provided by the device interface 250. FIG. 6 illustrates device 221, which has channels 301, 302, and 303, and device 222, which has channels 304, 305, and 306. In this example, the DMA engine 118 requires that the device 221 send a data request 307 whenever any one of the channels 301, 302, or 303 of the device 221 needs servicing. Similarly, the device 222 sends a data request 308 whenever one or more of the channels 304, 305 or 306 requires servicing. Because a request can represent one of several channels, the arbitration performed by the devices interface 250 is per device rather than per channel. Each device therefore has the responsibility of indicating which channel is most urgent or critical, and the latency that the device can experience is determined from the urgent channel.

The device interface 250 has an arbitration mechanism that is used to determine which devices are eligible to make requests to the DMA engine 118. In other words, a data request can only be made to the DMA engine when a device is eligible to make a request. In this example, the arbitration mechanism includes an arbitration count 251 that is represented by four bits, but other representations are equally valid. Eligible devices are determined, for example, by the following comparison logic: ((arbitration count XOR devVal) & devMask), where devVal is the device value and devMask is a defined value.

Whenever this logic comparison is true for a particular device, that device is eligible to make a data request for data from the data reservoir of the DMA engine. Using this comparison logic, the eligibility of a particular device can be programmed. More specifically, a particular device can be eligible to make a request every cycle, every other cycle, every fourth cycle, every eighth cycle or every sixteenth cycle. This logic also allows the eligibility of the devices to be staggered or scheduled such that any one device does not consume the available bandwidth. As used herein, "cycle" can refer to a defined time window, a certain number of clock cycles, or any other period in which data requests from eligible devices can be made or serviced.

For example, the device 221 may only be eligible every time the two least significant bits of the arbitration count 251 are zero. In this situation, the device 221 would be an eligible device for only one out of four cycles or arbitration counts. In a similar situation, the device 222 may only be eligible to make a data request every time the two least significant bits of the arbitration count 251 are both ones. In this situation, the device 222 is only eligible for one out of every four cycles. Even though the device 221 and the device 222 are only eligible for one out of every four cycles, they are eligible to make a data request on different cycles. In this manner, the requests of the devices can be scheduled in an efficient manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. In a system including a main memory storing data for a plurality of devices that each include one or more channels for making data requests, a method for arbitrating data requests from the plurality of devices, the method comprising the acts of:
   creating a first arbitration mechanism associated with a direct memory access (DMA) engine;
   creating a second arbitration mechanism associated with the DMA engine;
   at the first arbitration mechanism, receiving at least one data request from each of the plurality of devices, and such that each of the plurality of devices has made at least one corresponding data request;
   selecting, using the first arbitration mechanism, one or more eligible devices from the plurality of devices, the one or more eligible devices including all devices having at least one corresponding data request and which are also eligible to have their at least one corresponding data request fulfilled by the DMA engine during a particular DMA cycle, such selection of the one or more eligible devices being evaluated on a per device basis, treating each device of the plurality of devices as a separate unit for any and all channels of such device, and wherein the one or more eligible devices selected on the per device basis include a plurality of different types of channels;
   after determining the one or more eligible devices, using the second arbitration mechanism to select, from among the at least one corresponding data request of each of the one or more eligible devices, one or more cycle data requests that are to be fulfilled during the particular DMA cycle, wherein selecting the one or more cycle data requests includes evaluating the at least one corresponding data request of each of the one or more eligible devices on a per channel basis; and
   processing the selected one or more corresponding data requests of using the DMA engine during the particular DMA cycle.

2. A method as defined in claim 1, wherein the first arbitration mechanism is a counter.

3. A method as defined in claim 2, further comprising the act of incrementing the counter after all of the one or more eligible devices have had an opportunity to make a data request to the DMA engine.

4. A method as defined in claim 1, wherein the act of selecting the one or more eligible devices further comprises the act of performing a logic operation using device identifiers for each of the plurality of devices, wherein each of the plurality of devices is selected as an eligible device when the logic operation is true.

5. A method as defined in claim 1, further comprising the act of processing data requests of all of the plurality of devices within a programmable time period.

6. A method as defined in claim 5, wherein the programmable time period is defined by the first arbitration mechanism.

7. A method as defined in claim 1, further comprising the act of accessing a data reservoir of the DMA engine for data according to the data requests.

8. A method as defined in claim 1, further comprising the act of sending data to a data reservoir of the DMA engine in accordance with the data requests.

9. A method as defined in claim 1, further comprising the act of maintaining a data reservoir by accessing the main memory as determined by a memory interface.

10. For a system including a main memory storing data for a plurality of devices that each include one or more channels for making data requests, a computer program product comprising one or more computer readable storage media storing computer executable instructions that implement a method for arbitrating data requests from the plurality of devices, the method comprising the acts of:
   creating a first arbitration mechanism associated with a direct memory access (DMA) engine;
   creating a second arbitration mechanism associated with the DMA engine;
   at the first arbitration mechanism, receiving at least one data request from each of the plurality of devices, and such that each of the plurality of devices has made at least one corresponding data request;
   selecting, using the first arbitration mechanism, one or more eligible devices from the plurality of devices, the one or more eligible devices including all devices having at least one corresponding data request and which are also eligible to have their at least one corresponding data request fulfilled by the DMA engine during a particular DMA cycle, such selection of the one or more eligible devices being evaluated on a per device basis, treating each device of the plurality of devices as a separate unit for any and all channels of such device, and wherein the one or more eligible devices selected on the per device basis include a plurality of different types of channels;
   after determining the one or more eligible devices, using the second arbitration mechanism to select, from among the at least one corresponding data request of each of the one or more eligible devices, one or more cycle data requests that are to be fulfilled during the particular DMA cycle, wherein selecting the one or more cycle data requests includes evaluating the at least one corresponding data request of each of the one or more eligible devices on a per channel basis; and
   processing the selected one or more corresponding data requests of using the DMA engine during the particular DMA cycle.

11. A computer program product as defined in claim 10, wherein the first arbitration mechanism is a counter.

12. A computer program product as defined in claim 11, the method further comprising the act of incrementing the counter after all of the one or more eligible devices have had an opportunity to make a data request to the DMA engine.

13. A computer program product as defined in claim 10, wherein the act of selecting one or more eligible devices further comprises the act of performing a logic operation using device identifiers for each of the plurality of devices, wherein each of the plurality of devices is selected as an eligible device when the logic operation is true.

14. A computer program product as defined in claim 10, the method further comprising the act of processing data requests of all of the plurality of devices within a programmable time period.

15. A computer program product as defined in claim 10, wherein the programmable time period is defined by the first arbitration mechanism.

16. A computer program product as defined in claim 10, the method further comprising the act of accessing a data reservoir of the DMA engine for data according to the data requests.

17. A computer program product as defined in claim 10, the method further comprising the act of sending data to a data reservoir of the DMA engine in accordance with the data requests.

18. A computer program product as defined in claim 10, the method further comprising the act of maintaining a data reservoir by accessing the main memory as determined by a memory interface.

19. A method as recited in claim 1, wherein selecting one or more eligible devices using the first arbitration mechanism comprises the first arbitration mechanism evaluating factors including bandwidth requirements of each channel associated with each of the plurality of devices.

20. A method as recited in claim 19, wherein selecting one or more eligible devices using the first arbitration mechanism comprises the first arbitration mechanism evaluating further factors including: anticipated response time and a duration of viable data in a data reservoir.

* * * * *